(12) United States Patent
Aono et al.

(10) Patent No.: US 10,955,389 B2
(45) Date of Patent: Mar. 23, 2021

(54) SAMPLE INTRODUCTION DEVICE FOR GAS CHROMATOGRAPH

(71) Applicant: SHIMADZU CORPORATION, Kyoto (JP)

(72) Inventors: Akira Aono, Kyoto (JP); Isao Sawamura, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 189 days.

(21) Appl. No.: 16/077,068

(22) PCT Filed: Mar. 7, 2016

(86) PCT No.: PCT/JP2016/056946
§ 371 (c)(1),
(2) Date: Aug. 10, 2018

(87) PCT Pub. No.: WO2017/154067
PCT Pub. Date: Sep. 14, 2017

(65) Prior Publication Data
US 2019/0041367 A1 Feb. 7, 2019

(51) Int. Cl.
*G01N 30/20* (2006.01)
*G01N 30/18* (2006.01)
(Continued)

(52) U.S. Cl.
CPC ............ *G01N 30/20* (2013.01); *G01N 30/06* (2013.01); *G01N 30/12* (2013.01); *G01N 30/16* (2013.01);
(Continued)

(58) Field of Classification Search
CPC ........ G01N 30/20; G01N 30/06; G01N 30/16; G01N 30/12; G01N 30/18; G01N 2030/025
(Continued)

(56) References Cited

U.S. PATENT DOCUMENTS 8,075,842 B1 * 12/2011 Meece ................. G01N 1/4055
422/67
8,092,744 B1 * 1/2012 Meece ................. G01N 30/12
422/68.1
(Continued)

FOREIGN PATENT DOCUMENTS

JP 5-172744 A 7/1993
JP 2006-526154 A 11/2006
(Continued)

OTHER PUBLICATIONS

International Search Report for PCT/JP2016/056946 dated Apr. 26, 2016.
(Continued)

*Primary Examiner* — Marrit Eyassu
(74) *Attorney, Agent, or Firm* — Sughrue Mion, PLLC

(57) ABSTRACT

A sample introduction device 100 includes a heating unit 102, an ultraviolet irradiation unit 103, and a sample supply part 106. The heating unit 102 vaporizes a sample 22 by heating externally a container 2 in which the sample 22 is enclosed. The ultraviolet irradiation unit 103 causes ultraviolet rays to pass through the container 2 and irradiates the sample 22 with the ultraviolet rays. The sample supply part 106 supplies the sample vaporized in the container 2 to a gas chromatograph 1 side.

9 Claims, 10 Drawing Sheets

(51) Int. Cl.
*G01N 30/06* (2006.01)
*G01N 30/16* (2006.01)
*G01N 30/12* (2006.01)
*G01N 30/02* (2006.01)

(52) U.S. Cl.
CPC ....... *G01N 30/18* (2013.01); *G01N 2030/025* (2013.01)

(58) Field of Classification Search
USPC ...................................................... 73/864.81
See application file for complete search history.

(56) References Cited

U.S. PATENT DOCUMENTS

| | | | |
|---|---|---|---|
| 9,274,030 | B2 | 3/2016 | Aono |
| 9,274,091 | B2 * | 3/2016 | Danilchik .......... G01N 33/1826 |
| 2006/0094118 | A1 | 5/2006 | Tipler et al. |
| 2010/0107730 | A1 * | 5/2010 | Aono .................... G01N 30/16 |
| | | | 73/23.39 |
| 2014/0158615 | A1 * | 6/2014 | Senf ................... G01N 30/6091 |
| | | | 210/635 |
| 2015/0047442 | A1 | 2/2015 | Aono |
| 2015/0233874 | A1 * | 8/2015 | Aono ..................... G01N 30/16 |
| | | | 73/23.41 |
| 2015/0276689 | A1 | 10/2015 | Watanabe et al. |

FOREIGN PATENT DOCUMENTS

| | | | |
|---|---|---|---|
| JP | 2009-092413 A | | 4/2009 |
| JP | 2009092413 A | * | 4/2009 |
| JP | 2013053974 A | * | 3/2013 |
| JP | 5648608 B2 | | 1/2015 |

OTHER PUBLICATIONS

Communication dated Oct. 2, 2019 from the European Patent Office in application No. 16893399.2.

* cited by examiner

Prior Art

SAMPLE INTRODUCTION DEVICE FOR GAS CHROMATOGRAPH

CROSS REFERENCE TO RELATED APPLICATIONS

This application is a National Stage of International Application No. PCT/JP2016/056946 filed Mar. 7, 2016.

TECHNICAL FIELD

The present invention relates to a sample introduction device for a gas chromatograph which guides a vaporized sample to a gas chromatograph.

BACKGROUND ART

As an example of a sample introduction device for introducing a sample into a gas chromatograph, a sample introduction device adopting a thermal desorption system is known (for example, see Patent Document 1 below). In this type of sample introduction device, by heating a sample tube in which a sample is trapped to desorb sample components, the sample components are once trapped in a trap column. Then, by heating the sample components in the trap column, the sample components are desorbed. Thus, the sample components can be introduced into a gas chromatograph.

In the case of trapping a sample in the sample tube, for example, a chamber is used. Specifically, by heating the inside of the chamber and vaporizing the sample in a state where the sample is contained in the chamber, the vaporized sample is trapped in the sample tube. By setting the sample tube in which the sample is trapped in this manner in the sample introduction device adopting the thermal desorption system, the sample in the sample tube is desorbed and is introduced into the gas chromatograph.

When the sample is vaporized in the chamber, if the sample is irradiated with ultraviolet rays, the sample may be changed in quality. That is, by heating the sample while irradiating the sample with ultraviolet rays, it is possible to trap a gas generated at a time when the sample is changed in quality in the sample tube and to analyze the gas.

FIG. 10 is a schematic cross-sectional view for explaining an aspect for trapping a sample in a sample tube 500. As illustrated in FIG. 10, a sample 501 is contained in a chamber 502 and is heated. An ultraviolet lamp 503 emits ultraviolet rays into the chamber 502. In addition, an inert gas such as a nitrogen gas or a helium gas is supplied into the chamber 502. The sample tube 500 is detachable from the chamber 502.

In the case of trapping the sample 501 in the sample tube 500, as illustrated in FIG. 10, the sample 501 is heated while being irradiated with ultraviolet rays from the ultraviolet lamp 503 in a state where the sample tube 500 is attached to the chamber 502. Thus, the sample 501 is vaporized and gas is generated. Then, the inert gas is supplied into the chamber 502, and therefore the vaporized sample is introduced into the sample tube 500 together with the inert gas.

An adsorbent 504 is provided in the sample tube 500. The vaporized sample is adsorbed and trapped by the adsorbent while passing through the sample tube 500. After the sample is trapped in the sample tube 500 in this manner, the sample tube 500 is detached from the chamber 502 and set in a sample introduction device adopting a thermal desorption system.

PRIOR ART DOCUMENT

Patent Document

Patent Document 1: JP 5648608 B1

SUMMARY OF THE INVENTION

Problems to be Solved by the Invention

However, in the case of trapping a sample in the sample tube 500 by using a conventional method as described above, it is necessary to detach the sample tube 500 from the chamber 502 and to set the sample tube 500 in the sample introduction device. In addition, in the case of trapping different types of samples in the sample tube 500, it is necessary to clean the inside of the chamber 502 every time a sample is trapped. Therefore, an operation for analyzing a sample is complicated.

The present invention has been made in view of the above circumstances, and an object of the present invention is to provide a sample introduction device for a gas chromatograph capable of simplifying an operation for analyzing a sample.

Means for Solving the Problems (1) A sample introduction device for a gas chromatograph according to the present invention includes a heating unit, an ultraviolet irradiation unit, and a sample supply part. The heating unit vaporizes a sample by heating externally a container in which the sample is enclosed. The ultraviolet irradiation unit causes ultraviolet rays to pass through the container and irradiates the sample with the ultraviolet rays. The sample supply part supplies the sample vaporized in the container to a gas chromatograph side.

According to such a configuration, the sample in the container is irradiated with ultraviolet rays from the ultraviolet irradiation unit, and the sample in the container is heated by the heating unit to be vaporized. Therefore, the vaporized sample can be directly supplied from the container to the gas chromatograph side. Therefore, unlike the configuration in which a sample is trapped in a sample tube by using a chamber, the operation of setting the sample tube in a sample introduction device is unnecessary, and the operation of cleaning the chamber is also unnecessary. Therefore, the operation for analyzing a sample can be simplified.

(2) The container may be formed of a tubular member. In this case, the sample supply part may supply a carrier gas into the container from one-end side, so that the sample supply part may cause the sample vaporized in the container to flow out from the other-end side of the container, and supply the sample to the gas chromatograph side.

According to such a configuration, the container formed of a tubular member is provided in a flow channel for supplying the carrier gas, and the carrier gas supplied into the container enables the vaporized sample to be supplied from the container to the gas chromatograph side. Therefore, it is possible to introduce a sample into the gas chromatograph by using a configuration similar to the configuration of a sample introduction device adopting a thermal desorption system.

(3) The sample supply part may include a trap part that traps and concentrates the vaporized sample flowing out from the other-end side of the container, and may supply the sample concentrated in the trap part to the gas chromatograph side.

According to such a configuration, it is possible to concentrate the vaporized sample in the trap part and then supply the sample to the gas chromatograph side from the trap part. Therefore, a broad peak is less likely to appear in a chromatogram which is an analysis result in the gas chromatograph. Therefore, an analysis can be performed more accurately.

(4) The container may include a vial in which a sample is enclosed and a septum which seals an end portion of the vial. In this case, the sample supply part may include a needle which penetrates the septum and is inserted into the vial, may cause the sample vaporized in the container to flow out from the needle, and supply the sample to the gas chromatograph side.

According to such a configuration, the sample vaporized inside the vial is supplied to the gas chromatograph side through the needle penetrating the septum and inserted into the vial. Therefore, it is possible to introduce a sample into the gas chromatograph by using a configuration similar to the configuration of a sample introduction device adopting a headspace system.

(5) The sample supply part may include a trap part that traps and concentrates the sample vaporized and flowing out from the needle, and may supply the sample concentrated in the trap part to the gas chromatograph side.

According to such a configuration, it is possible to concentrate the vaporized sample in the trap part and then supply the sample to the gas chromatograph side from the trap part. Therefore, a broad peak is less likely to appear in a chromatogram which is an analysis result in the gas chromatograph. Therefore, an analysis can be performed more satisfactorily.

(6) The sample introduction device for a gas chromatograph may further include a container holding part which holds the container. In this case, a slit may be formed in the container holding part. Through the slit, ultraviolet rays from the ultraviolet irradiation unit is guided to the container.

According to such a configuration, the container can be stably held by the container holding part, and the slit formed in the container holding part can limit the area through which ultraviolet rays pass in the container. Therefore, since a sample in the container can be efficiently irradiated with ultraviolet rays, it is possible to perform an analysis more satisfactorily.

(7) The container holding part may include a mask part which blocks ultraviolet rays emitted from the ultraviolet irradiation unit toward an end portion of the container.

According to such a configuration, since the end portion of the container is not irradiated with ultraviolet rays, change in quality of a member provided at the end part of the container can be prevented.

Effects of the Invention

According to the present invention, unlike the configuration in which a sample is trapped in a sample tube by using a chamber, the operation of setting the sample tube in the sample introduction device is unnecessary, and the operation of cleaning the chamber is also unnecessary. Therefore, it is possible to simplify an operation for analyzing a sample.

MODE FOR CARRYING OUT THE INVENTION

1. First Embodiment

Figure 1:
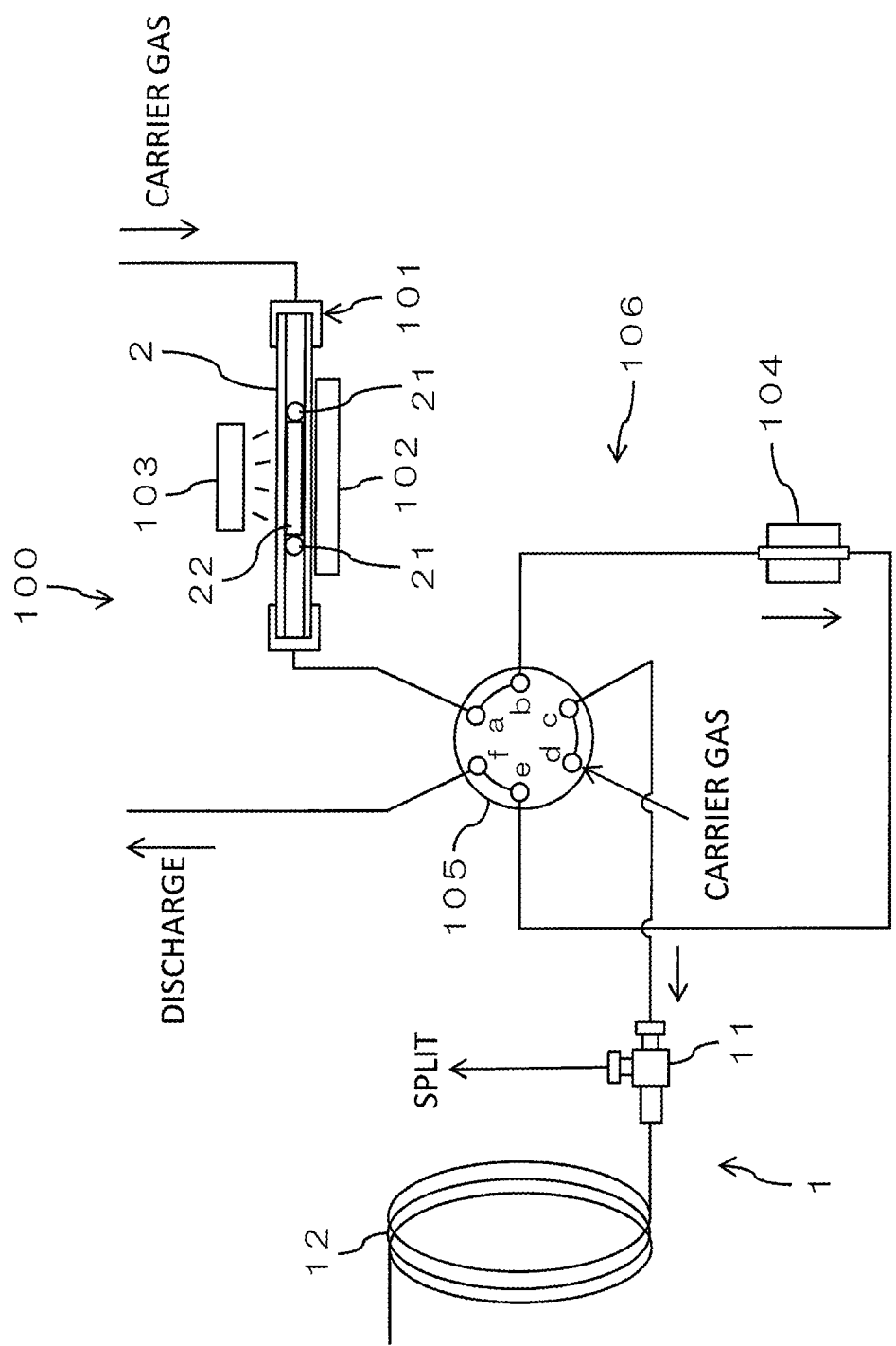
FIG. 1 is a flow channel diagram illustrating a configuration example of a sample introduction device according to a first embodiment of the present invention.

FIG. 1 is a flow channel diagram illustrating a configuration example of a sample introduction device 100 according to a first embodiment of the present invention. The sample introduction device 100 is a sample introduction device for a gas chromatograph configured to introduce a sample into a gas chromatograph 1. In the sample introduction device 100, a container 2 in which a sample is enclosed is set, and the sample (sample gas) vaporized in the container 2 is introduced into the gas chromatograph 1. Note that the gas chromatograph 1 is a concept which includes a gas chromatograph mass spectrometer.

The sample introduction device 100 includes a container holding part 101, a heating unit 102, an ultraviolet irradiation unit 103, a trap part 104, a flow channel switching part 105, and the like. The container holding part 101 and the trap part 104 are connected to the flow channel switching part 105 through pipes.

The container 2 is a transparent or translucent tubular elongated member made of quartz, for example. The container 2 is attached to the container holding part 101, and thus constitutes part of the pipe communicating with the flow channel switching part 105. The container holding part 101 includes a seal member (not illustrated) such as an O-ring. The seal member can prevent gas from leaking from the space between the container holding part 101 and the container 2.

In the container 2, a sample 22 is held in a state of being sandwiched between a pair of pieces of silica wool 21. For example, the sample 22 is a solid sample such as a resin; however, the sample 22 is not limited to this, and may be a liquid such as an adhesive. A carrier gas is supplied into the container 2 through a pipe, and the carrier gas which has passed through a space between the pair of pieces of silica wool 21 is sent to the flow channel switching part 105. The carrier gas may be an inert gas such as a nitrogen gas or a helium gas, or may be an active gas.

The heating unit 102 is provided near the container holding part 101 and vaporizes the sample 22 by heating externally the container 2 attached to the container holding part 101. Similarly to the heating unit 102, the ultraviolet irradiation unit 103 is provided near the container holding part 101 and emits ultraviolet rays toward the container 2 attached to the container holding part 101. Thus, the ultraviolet rays pass through the container 2, and the sample 22 is irradiated with the ultraviolet rays. A sample gas generated by vaporization of the sample 22 in the container 2 is sent to the flow channel switching part 105 together with the carrier gas supplied into the container 2.

The trap part 104 is constituted of, for example, a trap column, and traps and concentrates the sample (sample gas) vaporized in the container 2. By heating the trap part 104 in which the sample is concentrated, the sample in the trap part 104 is volatilized and desorbed, and the carrier gas transports the sample to the gas chromatograph 1. The container holding part 101, the trap part 104, the flow channel switching part 105, the pipes connecting them, and the like constitute a sample supply part 106 that supplies the sample vaporized in the container 2 to a gas chromatograph 1 side.

The flow channel switching part 105 is constituted of, for example, a six-way valve having six ports a to f. The port a of the flow channel switching part 105 communicates with the container holding part 101. Both end portions of the trap part 104 communicate with the port b and the port e of the flow channel switching part 105. The port c of the flow channel switching part 105 communicates with the gas chromatograph 1. A carrier gas is supplied to the port d of the flow channel switching part 105. The carrier gas is an inert gas such as a nitrogen gas or a helium gas. The port f of the flow channel switching part 105 communicates with a discharge port.

In the state illustrated FIG. 1, the port a and the port b of the flow channel switching part 105 communicate with each other, and the port e and the port f of the flow channel switching part 105 communicate with each other. Therefore, the carrier gas supplied from one-end side (upstream side) to the container 2 passes through the container 2 and then flows into the trap part 104 through the flow channel switching part 105. As a result, the sample vaporized in the container 2 flows out from the other-end side (downstream side) of the container 2, is supplied to the gas chromatograph 1 side, and is trapped in the trap part 104. The carrier gas obtained after the sample is trapped by the trap part 104 is discharged from the discharge port through the flow channel switching part 105.

In addition, in the state illustrated in FIG. 1, the port c and the port d of the flow channel switching part 105 communicate with each other. Therefore, the carrier gas supplied to the port d of the flow channel switching part 105 is guided from the port c to the gas chromatograph 1 without passing through the trap part 104. When the flow channel switching part 105 is switched after the sample is trapped in the trap part 104 in the above state, the sample is introduced from the trap part 104 to the gas chromatograph 1.

Figure 2:
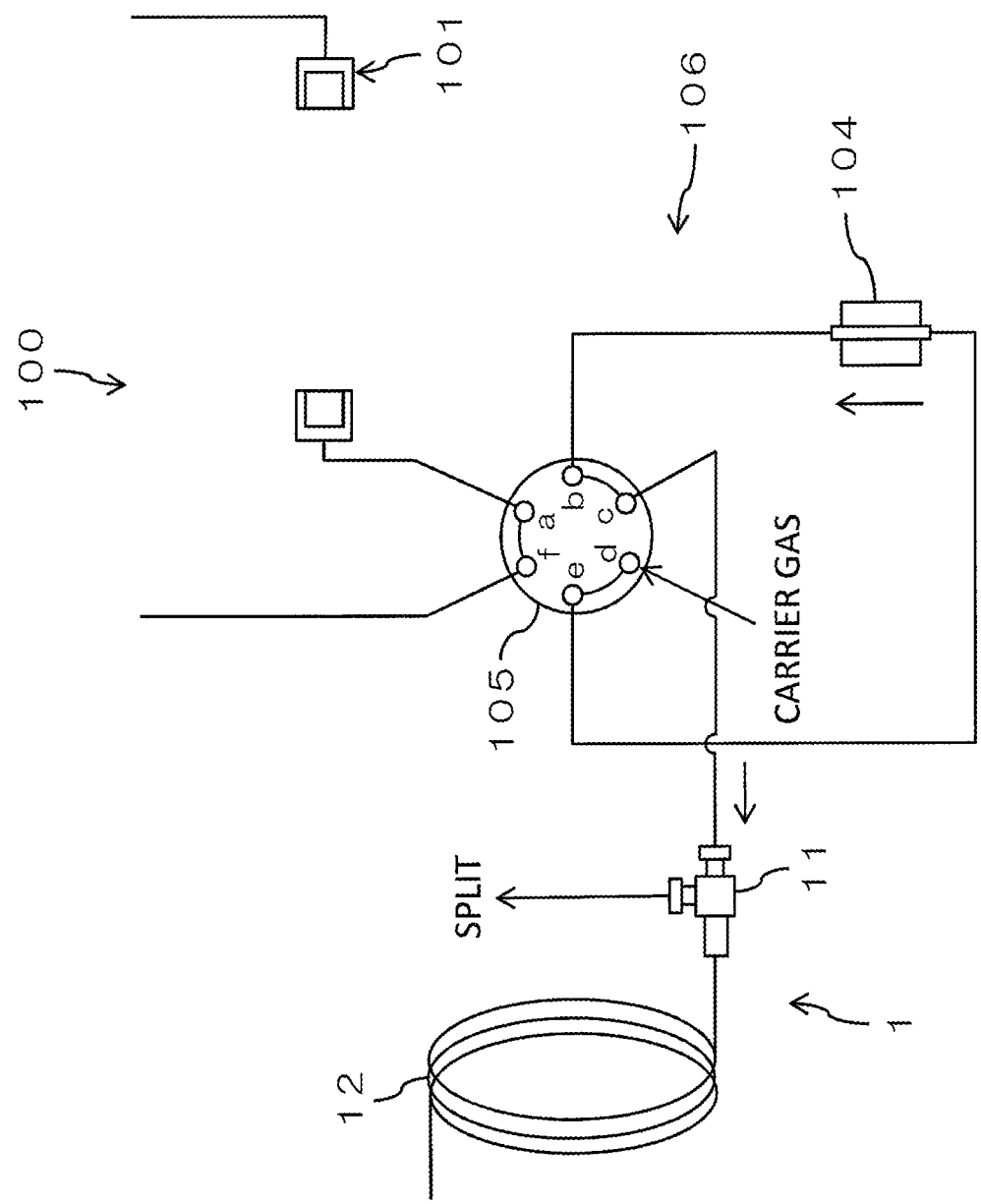
FIG. 2 is a flow channel diagram illustrating a state where a flow channel switching part is switched from the state illustrated in FIG. 1.

FIG. 2 is a flow channel diagram illustrating a state where the flow channel switching part 105 is switched from the state illustrated in FIG. 1. In this state, the port b and the port c of the flow channel switching part 105 communicate with each other, and the port d and the port e of the flow channel switching part 105 communicate with each other. Therefore, the carrier gas supplied to the port d of the flow channel switching part 105 flows from the port e into the trap part 104. At this time, the trap part 104 is heated. As a result, the sample concentrated in the trap part 104 is desorbed and is supplied to the gas chromatograph 1 side through the port b and the port c of the flow channel switching part 105.

In the state illustrated in FIG. 2, the port a and the port f of the flow channel switching part 105 communicate with each other. In this state, the container holding part 101 does not communicate with the trap part 104. Therefore, as illustrated in FIG. 2, the container 2 may be detached from the container holding part 101.

The gas chromatograph 1 includes a sample introduction part 11, a column 12, and the like. The sample supplied from the trap part 104 to the gas chromatograph 1 together with the carrier gas is introduced into the column 12 from the sample introduction part 11 and is separated into respective sample components while passing through the column 12. The respective sample components separated in this manner are detected by a detector (not illustrated), and a chromatogram is obtained as an analysis result.

Note that in the present embodiment, part of the sample supplied from the trap part 104 to the sample introduction part 11 is discharged to the outside together with the carrier gas. Thus, the sample is introduced into the column 12 using a so-called a split injection method. However, the present invention is not limited to such a configuration, and a configuration in which entirety of the sample supplied from the trap part 104 to the sample introduction part 11 is introduced into the column 12 may be adopted.

In the present embodiment, the sample 22 in the container 2 is irradiated with ultraviolet rays from the ultraviolet irradiation unit 103, and the sample 22 in the container 2 is heated and vaporized by the heating unit 102. Therefore, the vaporized sample (sample gas) can be directly supplied from the container 2 to the gas chromatograph 1 side. Therefore, unlike the configuration in which a sample is trapped in a sample tube by using a chamber, the operation of setting the sample tube in a sample introduction device is unnecessary, and the operation of cleaning the chamber is also unnecessary. Therefore, the operation for analyzing a sample can be simplified.

In particular, in the present embodiment, the container 2 formed of a tubular member is provided in the flow channel for supplying the carrier gas, and the carrier gas supplied into the container 2 enables the vaporized sample to be supplied from the container 2 to the gas chromatograph 1 side. Therefore, it is possible to introduce the sample into the gas chromatograph 1 by using a configuration similar to the configuration of a sample introduction device adopting a thermal desorption system.

In the present embodiment, it is possible to concentrate the vaporized sample in the trap part 104 and then supply the sample to the gas chromatograph 1 side from the trap part 104. Therefore, a broad peak is less likely to appear in a chromatogram which is an analysis result in the gas chromatograph 1. Therefore, an analysis can be performed more accurately.

2. Second Embodiment

Figure 3:
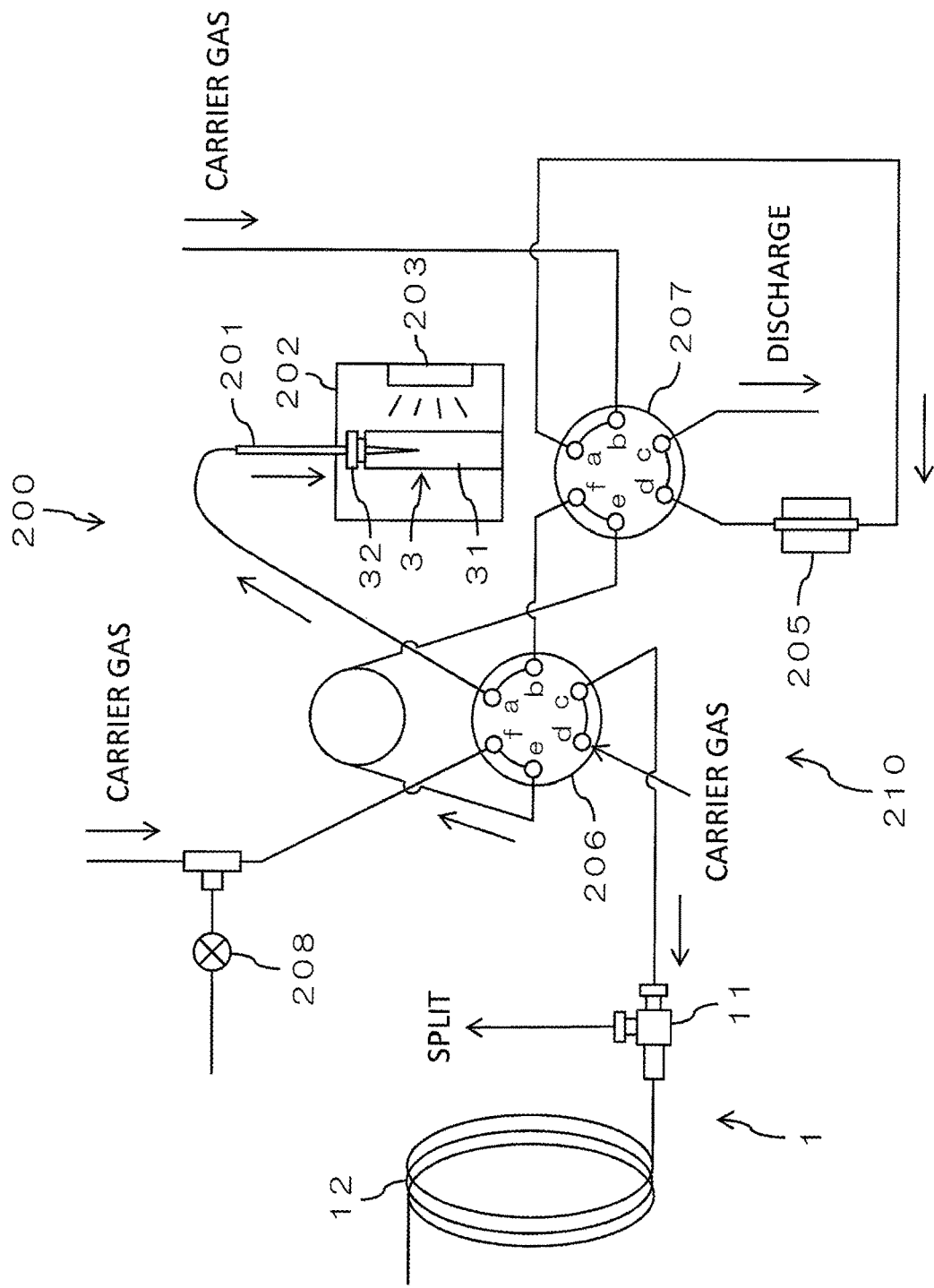
FIG. 3 is a flow channel diagram illustrating a configuration example of a sample introduction device according to a second embodiment of the present invention.

FIG. 3 is a flow channel diagram illustrating a configuration example of a sample introduction device 200 according to a second embodiment of the present invention. The sample introduction device 200 is a sample introduction device for a gas chromatograph configured to introduce a sample into a gas chromatograph 1. In the sample introduction device 200, a container 3 in which a sample is enclosed is set, and the sample (sample gas) vaporized in the container 3 is introduced into the gas chromatograph 1. Note that since the configuration of the gas chromatograph 1 is similar to that of the first embodiment, identical reference signs are given to the drawings, and a detailed description thereof will be omitted.

The sample introduction device 200 includes a needle 201, a heating unit 202, an ultraviolet irradiation unit 203, a trap part 205, a first flow channel switching part 206, a second flow channel switching part 207, and the like. The container 3 includes a transparent or translucent vial 31 made of, for example, quartz, and a resin septum 32 for closing an opening formed at an end portion of the vial 31.

The sample is enclosed in the vial 31. For example, the sample is a solid sample such as a resin; however, the sample is not limited to this, and may be a liquid such as an adhesive. One end portion of the needle 201 penetrates the septum 32 and is inserted into the vial 31, and the other end portion of the needle 201 is connected to the first flow channel switching part 206 through a pipe.

The heating unit 202 is constituted of, for example, an oven in which a heating chamber is formed. The inside of the heating unit 202 is kept at a set temperature by a heater (not illustrated). The container 3 is housed inside the heating unit 202. As a result, the container 3 is heated externally, and the sample in the container 3 is vaporized. The vaporized sample is stored in an upper space (headspace) in the container 3.

The ultraviolet irradiation unit 203 is attached to the heating unit 202 and emits ultraviolet rays toward the container 3 housed inside the heating unit 202. Thus, the ultraviolet rays pass through the container 3, and the sample is irradiated with the ultraviolet rays. A sample gas generated by vaporization of the sample in the container 3 flows out from the needle 201 inserted into the vial 31, and is sent to the first flow channel switching part 206.

The trap part 205 is constituted of, for example, a trap column, and traps and concentrates the sample (sample gas) sent from the container 3. By heating the trap part 205 in which the sample is concentrated, the sample in the trap part 205 is volatilized and desorbed, and the carrier gas transports the sample to the gas chromatograph 1. The needle 201, the trap part 205, the first flow channel switching part 206, the second flow channel switching part 207, pipes connecting them, and the like constitute a sample supply part 210 that supplies the sample vaporized in the container 3 to a gas chromatograph 1 side.

Each of the first flow channel switching part 206 and the second flow channel switching part 207 is constituted of, for example, a six-way valve having six ports a to f. The port a of the first flow channel switching part 206 communicates with the needle 201. The port b of the first flow channel switching part 206 communicates with the port f of the second flow channel switching part 207. The port c of the first flow channel switching part 206 communicates with the gas chromatograph 1. A carrier gas is supplied to the port d of the first flow channel switching part 206. The carrier gas is an inert gas such as a nitrogen gas or a helium gas.

The port e of the first flow channel switching part 206 communicates with the port e of the second flow channel switching part 207. A carrier gas can be supplied to the port f of the first flow channel switching part 206 through a pipe. The port f communicates with a discharge port through a branch passage branched from the pipe. The carrier gas may be an inert gas such as a nitrogen gas or a helium gas, or may be an active gas. A valve 208 is provided in the branch passage, and the valve 208 is closed in the state illustrated in FIG. 3.

Both end portions of the trap part 205 communicate with the port a and the port d of the second flow channel switching part 207. A carrier gas is supplied to the port b of the second flow channel switching part 207. The carrier gas may be an inert gas such as a nitrogen gas or a helium gas, or may be an active gas. The port c of the second flow channel switching part 207 communicates with a discharge port.

In the state illustrated in FIG. 3, the port a and the port b of the first flow channel switching part 206 communicate with each other, and the port e and the port f of the first flow channel switching part 206 communicate with each other. In addition, the port e and the port f of the second flow channel switching part 207 communicate with each other. Therefore, the carrier gas supplied to the port f of the first flow channel switching part 206 is sent to the needle 201. As illustrated in FIG. 3, if a tip portion of the needle 201 is inserted into the container 3, the carrier gas is supplied into the container 3 from the needle 201. Therefore, the inside of the container 3 is pressurized.

In the state illustrated in FIG. 3, the port c and the port d of the first flow channel switching part 206 communicate with each other, and the carrier gas supplied to the port d is guided from the port c to the gas chromatograph 1. In addition, the port a and the port b of the second flow channel switching part 207 communicate with each other, and the port c and the port d of the second flow channel switching part 207 communicate with each other. Therefore, the carrier gas supplied to the port b of the second flow channel switching part 207 passes through the trap part 205 and is discharged from the discharge port. When the second flow channel switching part 207 is switched after the inside of the container 3 is pressurized while the sample in the container 3 is vaporized in the above state, the sample vaporized in the container 3 is guided to the trap part 205.

Figure 4:
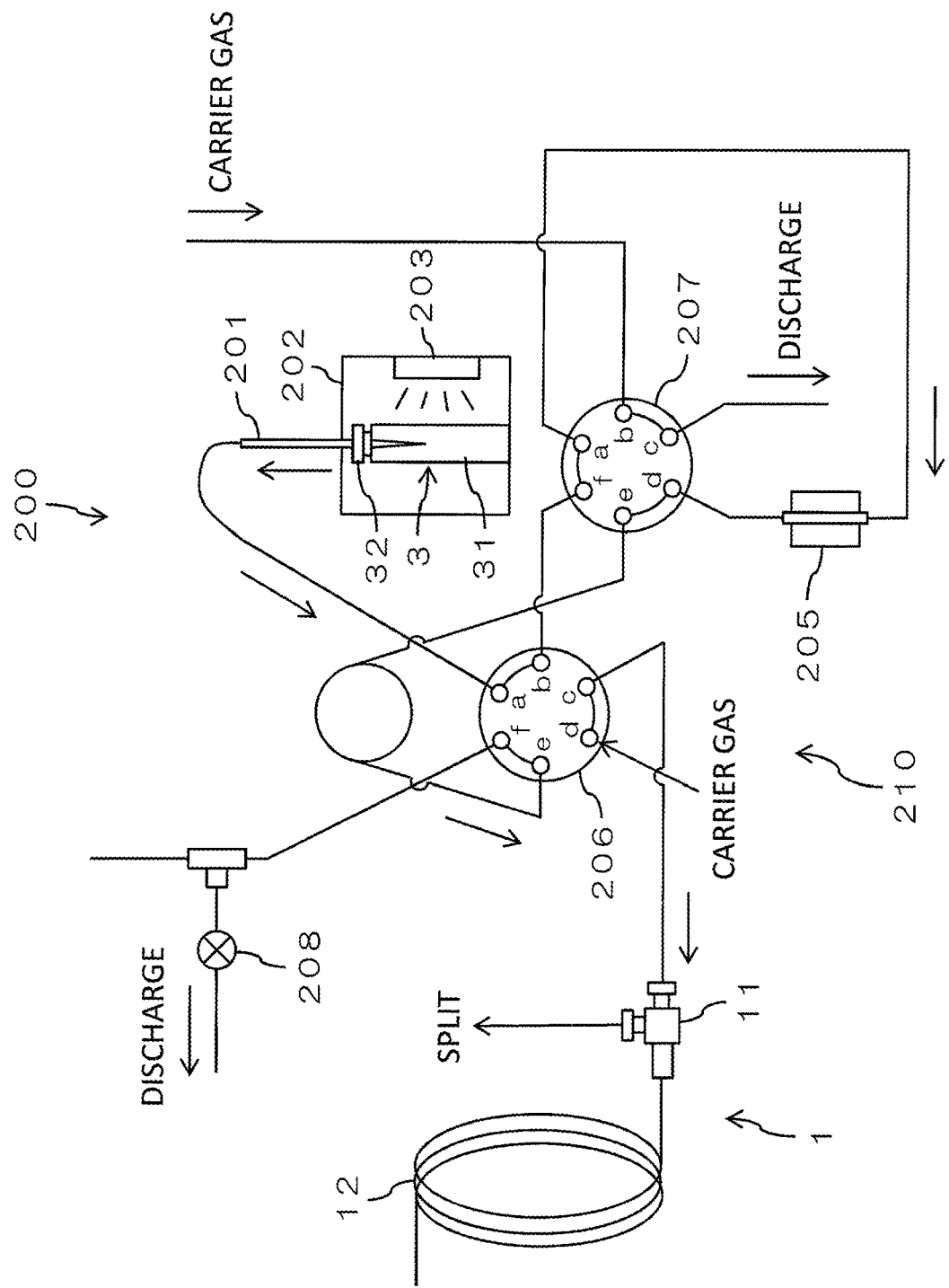
FIG. 4 is a flow channel diagram illustrating a state where a second flow channel switching part is switched from the state illustrated in FIG. 3.

FIG. 4 is a flow channel diagram illustrating a state where the second flow channel switching part 207 is switched from the state illustrated in FIG. 3. In this state, the port a and the port f of the second flow channel switching part 207 communicate with each other, and the port d and the port e of the second flow channel switching part 207 communicate with each other. The first flow channel switching part 206 remains in the state illustrated in FIG. 3. However, supply of the carrier gas to the port f of the first flow channel switching part 206 is stopped, and the valve 208 is opened. Therefore, the sample vaporized in the container 3 is supplied from the needle 201 to the gas chromatograph 1 side by pressure inside the container 3, and is trapped by the trap part 205. The carrier gas obtained after the sample is trapped is discharged from the port f of the first flow channel switching part 206 to the discharge port.

In the state illustrated in FIG. 4, the port b and the port c of the second flow channel switching part 207 communicate with each other. Therefore, the carrier gas supplied to the port b of the second flow channel switching part 207 is discharged from the port c to the discharge port. When the first flow channel switching part 206 is switched after the sample is trapped in the trap part 205 in the above state, the sample is introduced from the trap part 205 to the gas chromatograph 1.

Figure 5:
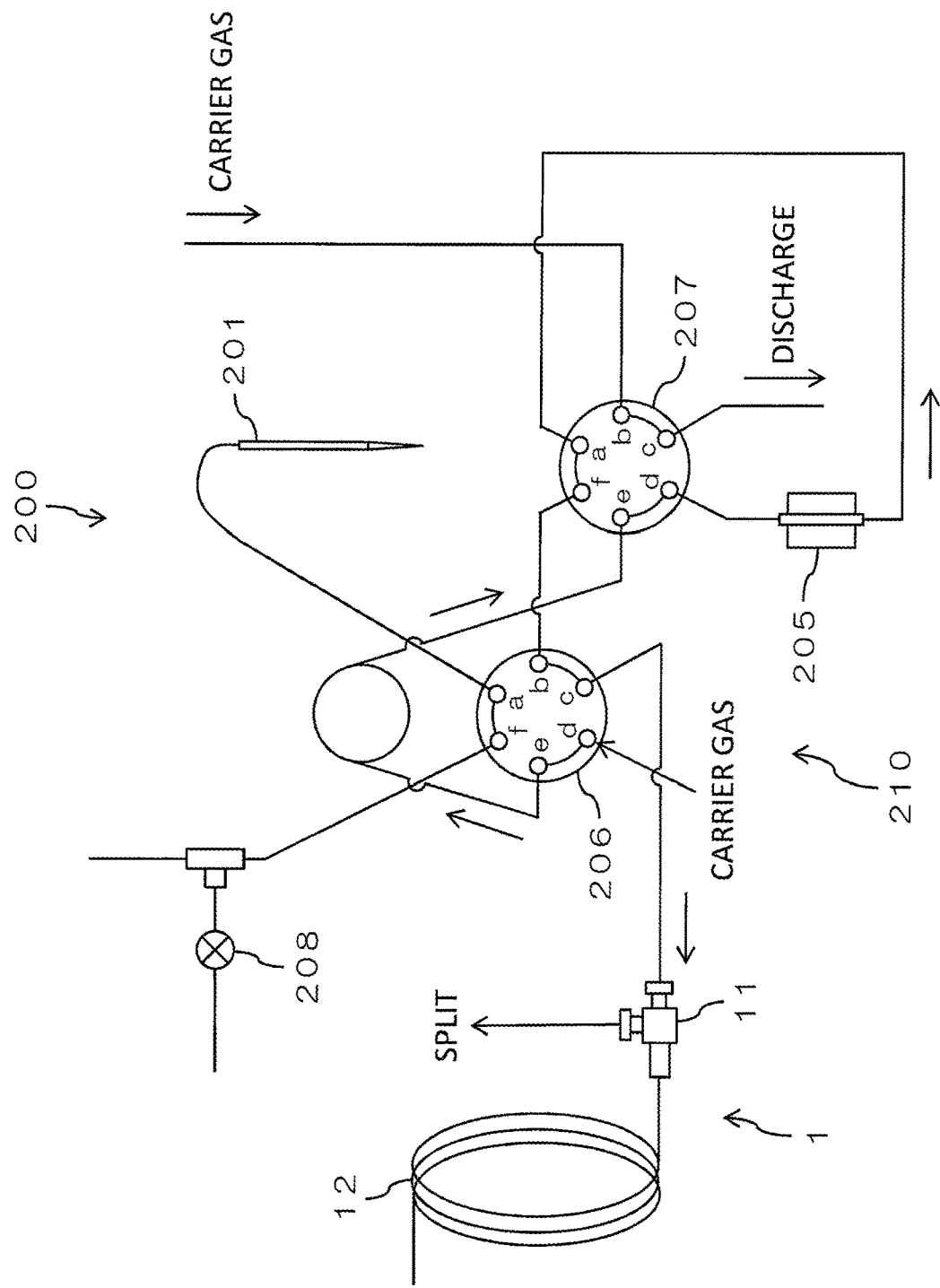
FIG. 5 is a flow channel diagram illustrating a state where a first flow channel switching part is switched from the state illustrated in FIG. 4.

FIG. 5 is a flow channel diagram illustrating a state where the first flow channel switching part 206 is switched from the state illustrated in FIG. 4. In this state, the port b and the port c of the first flow channel switching part 206 communicate with each other, and the port d and the port e of the first flow channel switching part 206 communicate with each other. Therefore, the carrier gas supplied to the port d of the first flow channel switching part 206 flows into the trap part 205 through the first flow channel switching part 206 and the second flow channel switching part 207. At this time, the trap part 205 is heated. As a result, the sample concentrated in the trap part 205 is desorbed and is supplied to the gas chromatograph 1 side through the port a and the port f of the second flow channel switching part 207 and the port b and the port c of the first flow channel switching part 206.

In addition, in the state illustrated in FIG. 5, the port a and the port f of the first flow channel switching part 206 communicate with each other. In this state, since the needle 201 does not communicate with the trap part 205, the needle 201 may be removed from the container 3 as illustrated in FIG. 5.

In the present embodiment, the sample in the container 3 is irradiated with ultraviolet rays from the ultraviolet irradiation unit 203, and the sample in the container 3 is heated and vaporized by the heating unit 202. Therefore, the vaporized sample (sample gas) can be directly supplied from the container 3 to the gas chromatograph 1 side. Therefore, unlike the configuration in which a sample is trapped in a sample tube by using a chamber, the operation of setting the sample tube in a sample introduction device is unnecessary, and the operation of cleaning the chamber is also unnecessary. Therefore, the operation for analyzing a sample can be simplified.

Particularly in the present embodiment, the sample vaporized inside the vial 31 is supplied to the gas chromatograph 1 side through the needle 201 penetrating the septum 32 and inserted into the vial 31. Therefore, it is possible to introduce the sample into the gas chromatograph 1 by using a configuration similar to the configuration of a sample introduction device adopting a headspace system.

In addition, in the present embodiment, it is possible to concentrate the vaporized sample in the trap part 205 and then supply the sample to the gas chromatograph 1 side from the trap part 205. Therefore, a broad peak is less likely to appear in a chromatogram which is an analysis result in the gas chromatograph 1. Therefore, an analysis can be performed more satisfactorily.

3. Third Embodiment

Figure 6:
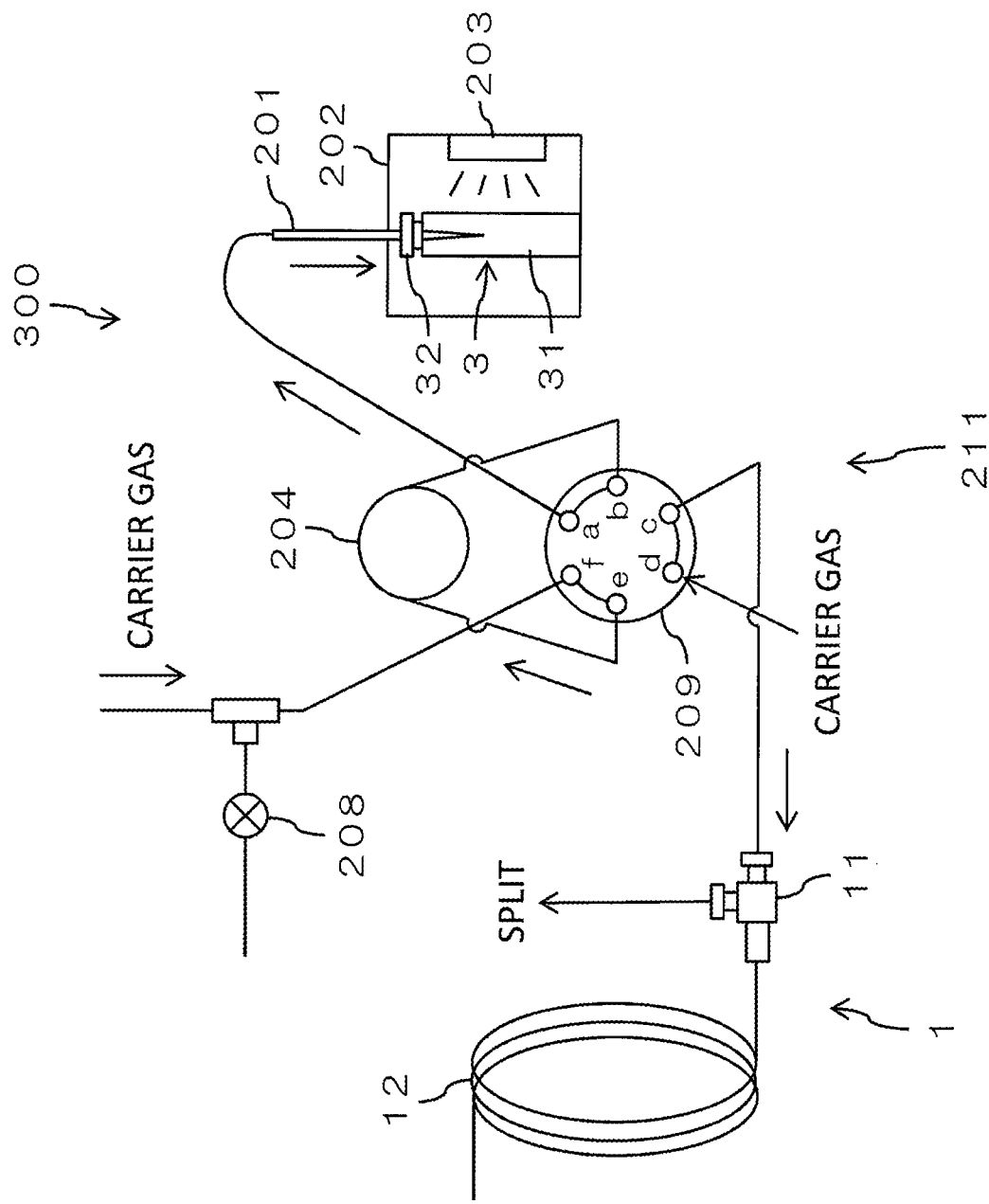
FIG. 6 is a flow channel diagram illustrating a configuration example of a sample introduction device according to a third embodiment of the present invention.

FIG. 6 is a flow channel diagram illustrating a configuration example of a sample introduction device 300 according to a third embodiment of the present invention. The sample introduction device 300 is a sample introduction device for a gas chromatograph configured to introduce a sample into a gas chromatograph 1. In the sample introduction device 300, a container 3 in which a sample is enclosed is set, and the sample (sample gas) vaporized in the container 3 is introduced into the gas chromatograph 1. Note that since the configurations of the gas chromatograph 1 and the container 3 are similar to those of the second embodiment, identical reference signs are given to the drawings, and a detailed description thereof will be omitted.

The sample introduction device 300 includes a needle 201, a heating unit 202, an ultraviolet irradiation unit 203, a sample loop 204, a flow channel switching part 209, and the like. Since the configurations of the needle 201, the heating unit 202, and the ultraviolet irradiation unit 203 are similar to those of the first embodiment, detailed descriptions of them will be omitted.

The sample loop 204 functions as a buffer for temporarily storing a sample (sample gas) flowing out from inside the container 3 through the needle 201. A carrier gas transports the sample gas stored in the sample loop 204 to a gas chromatograph 1 side. The needle 201, the sample loop 204, the flow channel switching part 209, pipes connecting them, and the like constitute a sample supply part 211 that supplies the sample vaporized in the container 3 to the gas chromatograph 1 side.

The flow channel switching part 209 is constituted of, for example, a six-way valve having six ports a to f. The port a of the flow channel switching part 209 communicates with the needle 201. Both end portions of the sample loop 204 communicate with the port b and the port e of the flow channel switching part 209. The port c of the flow channel switching part 209 communicates with the gas chromatograph 1. A carrier gas is supplied to the port d of the flow channel switching part 209. The carrier gas is an inert gas such as a nitrogen gas or a helium gas.

A carrier gas can be supplied to the port f of the flow channel switching part 209 through a pipe. The port f communicates with a discharge port through a branch passage branched from the pipe. The carrier gas may be an inert gas such as a nitrogen gas or a helium gas, or may be an active gas. A valve 208 is provided in the branch passage as in the second embodiment. In the state illustrated FIG. 6, the valve 208 is closed.

In the state illustrated FIG. 6, the port a and the port b of the flow channel switching part 209 communicate with each other, and the port e and the port f of the flow channel switching part 209 communicate with each other. Therefore, the carrier gas supplied to the port f of the flow channel switching part 209 passes through the sample loop 204 and is sent to the needle 201. As illustrated in FIG. 6, if a tip portion of the needle 201 is inserted into the container 3, the carrier gas is supplied into the container 3 from the needle 201. Therefore, the inside of the container 3 is pressurized.

In addition, in the state illustrated in FIG. 6, the port c and the port d of the flow channel switching part 209 communicate with each other. Therefore, the carrier gas supplied to the port d of the flow channel switching part 209 is guided from the port c to the gas chromatograph 1. When supply of the carrier gas to the port f of the flow channel switching part 209 is stopped and the valve 208 is opened after the inside of the container 3 is pressurized while the sample in the container 3 is vaporized in this state, the sample vaporized in the container 3 is guided to the sample loop 204.

Figure 7:
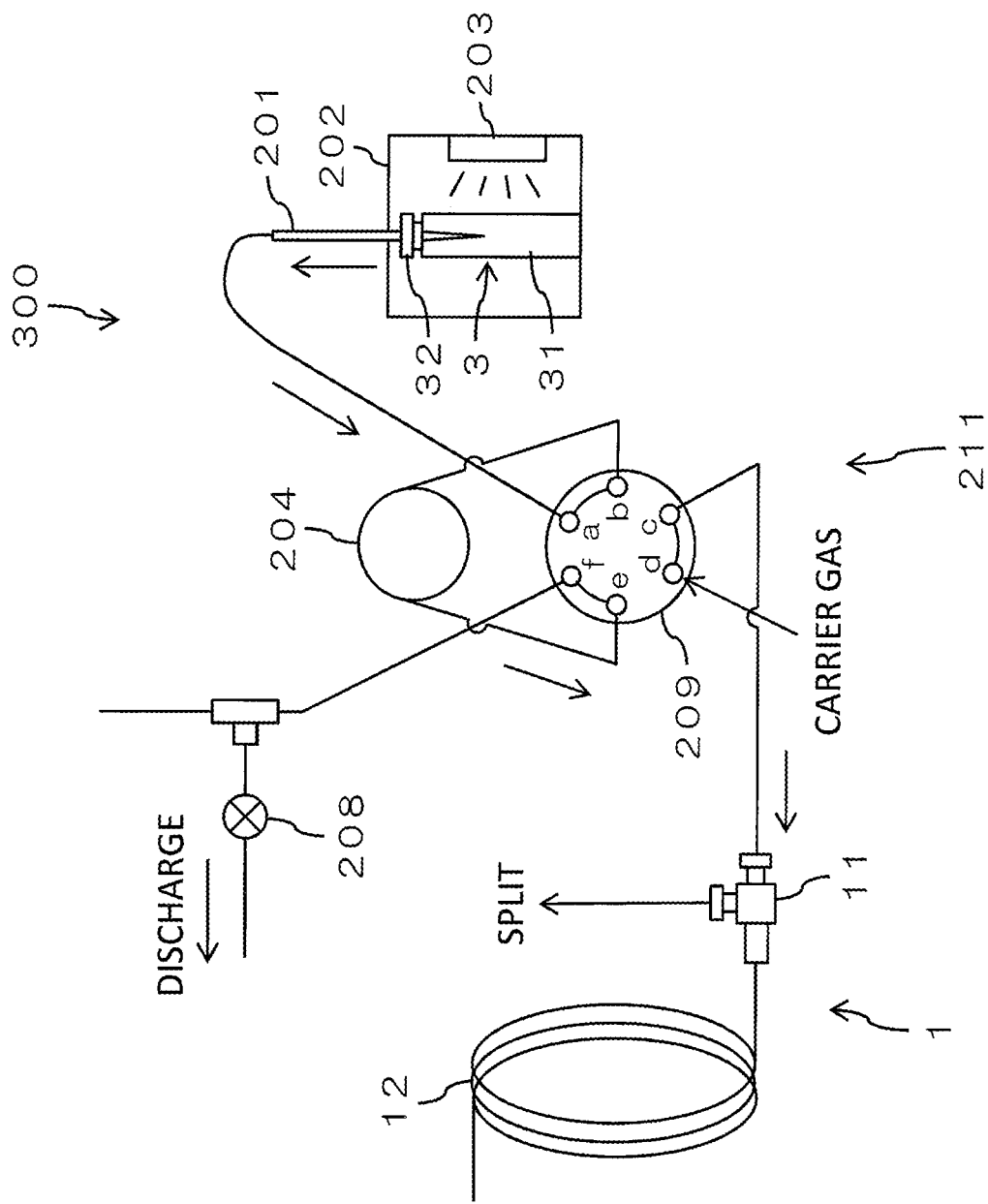
FIG. 7 is a flow channel diagram illustrating a state where supply of a carrier gas to a port f of a flow channel switching part is stopped and a valve is opened from the state illustrated in FIG. 6.

FIG. 7 is a flow channel diagram illustrating a state where supply of the carrier gas to the port f of the flow channel switching part 209 is stopped and the valve 208 is opened from the state illustrated in FIG. 6. In this state, the sample vaporized in the container 3 is supplied from the needle 201 to the gas chromatograph 1 side by pressure inside the container 3, and the sample loop 204 is filled with the sample. The sample overflowing from the sample loop 204 is discharged from the port f of the flow channel switching part 209 to the discharge port.

When the flow channel switching part 209 is switched after the sample is stored in the sample loop 204 in the above state, the sample is introduced from the sample loop 204 to the gas chromatograph 1.

Figure 8:
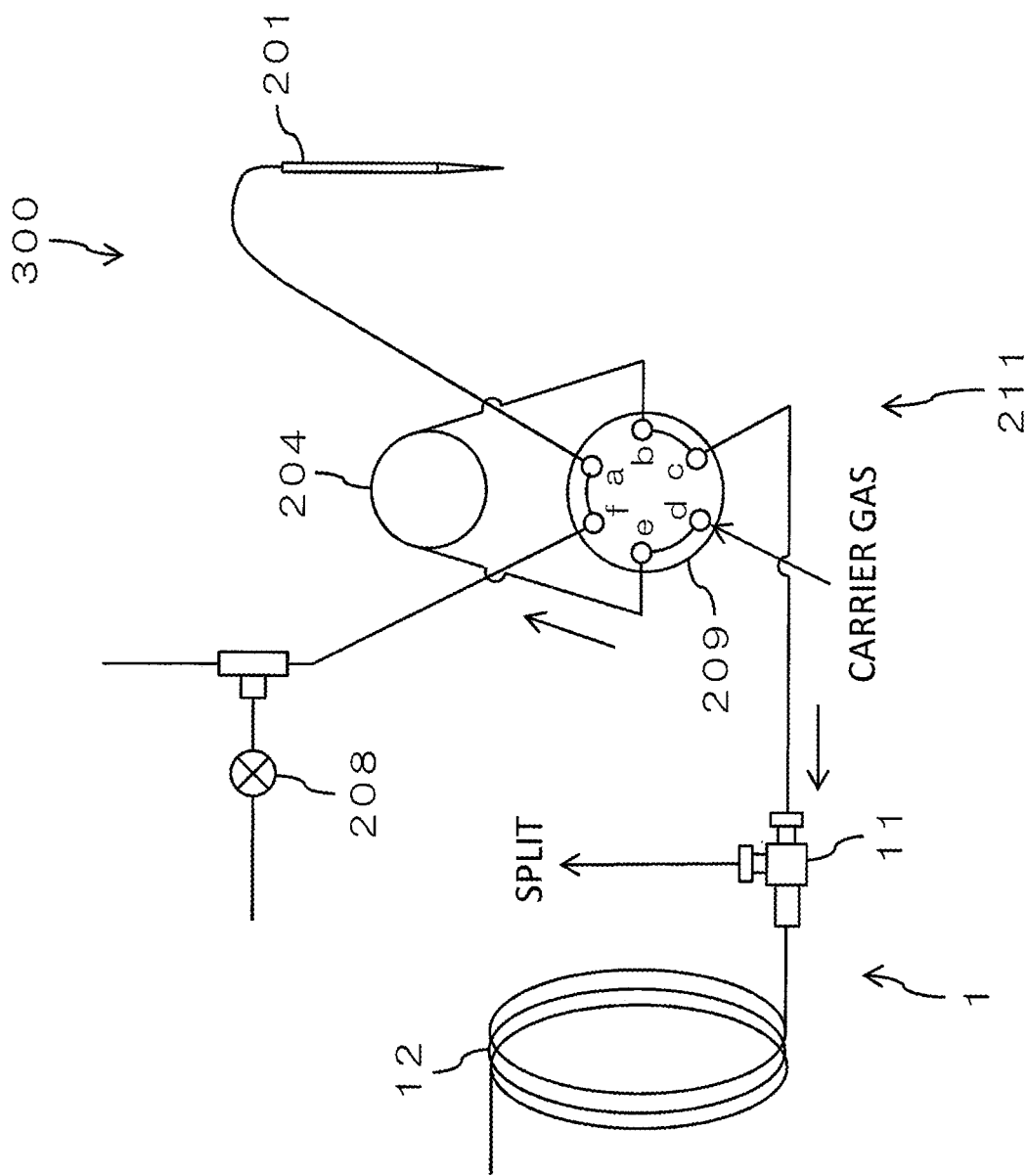
FIG. 8 is a flow channel diagram illustrating a state where a flow channel switching part is switched from the state illustrated in FIG. 7.

FIG. 8 is a flow channel diagram illustrating a state where the flow channel switching part 209 is switched from the state illustrated in FIG. 7. In this state, the port b and the port c of the flow channel switching part 209 communicate with each other, and the port d and the port e of the flow channel switching part 209 communicate with each other. Therefore, the carrier gas supplied to the port d of the flow channel switching part 209 flows into the sample loop 204 through the port e. As a result, the sample in the sample loop 204 is supplied to the gas chromatograph 1 side through the port b and the port c of the flow channel switching part 209.

In addition, in the state illustrated in FIG. 8, the port a and the port f of the flow channel switching part 209 communicate with each other. In this state, since the needle 201 is not communicated with the sample loop 204, the needle 201 may be removed from the container 3 as illustrated in FIG. 8.

As in the present embodiment, a sample introduction device for a gas chromatograph according to the present invention may not include the trap part 205 as in the second embodiment. Similarly, also in the first embodiment, the trap part 104 may be omitted.

4. Container Holding Structure

Figure 9:
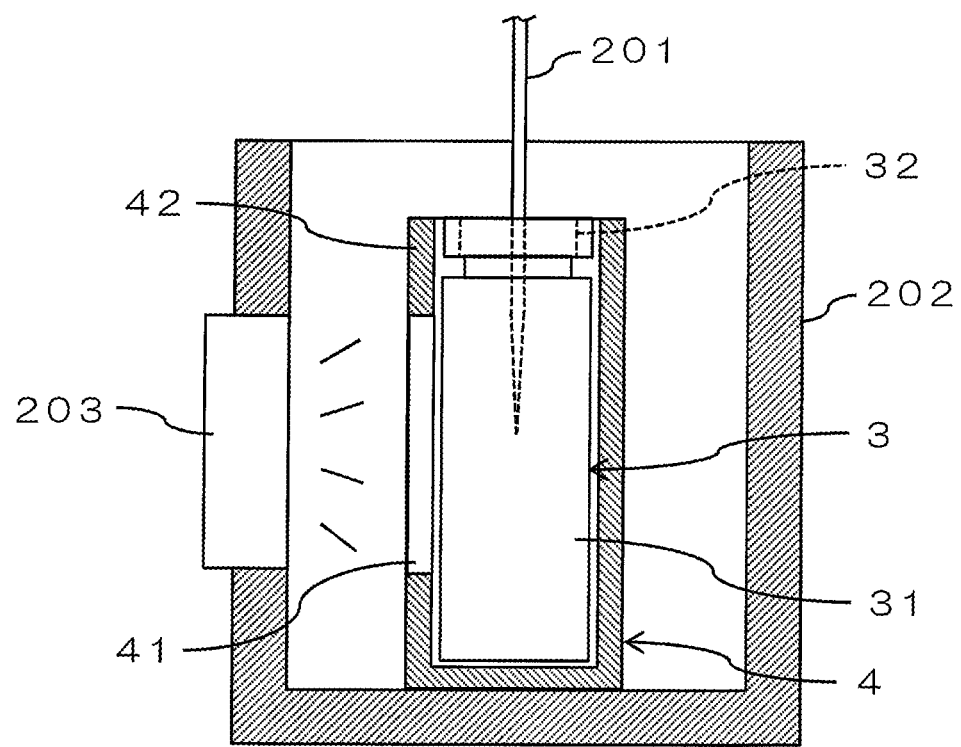
FIG. 9 is a schematic cross-sectional view illustrating an example of a specific configuration in a heating unit 202.
Figure 10:
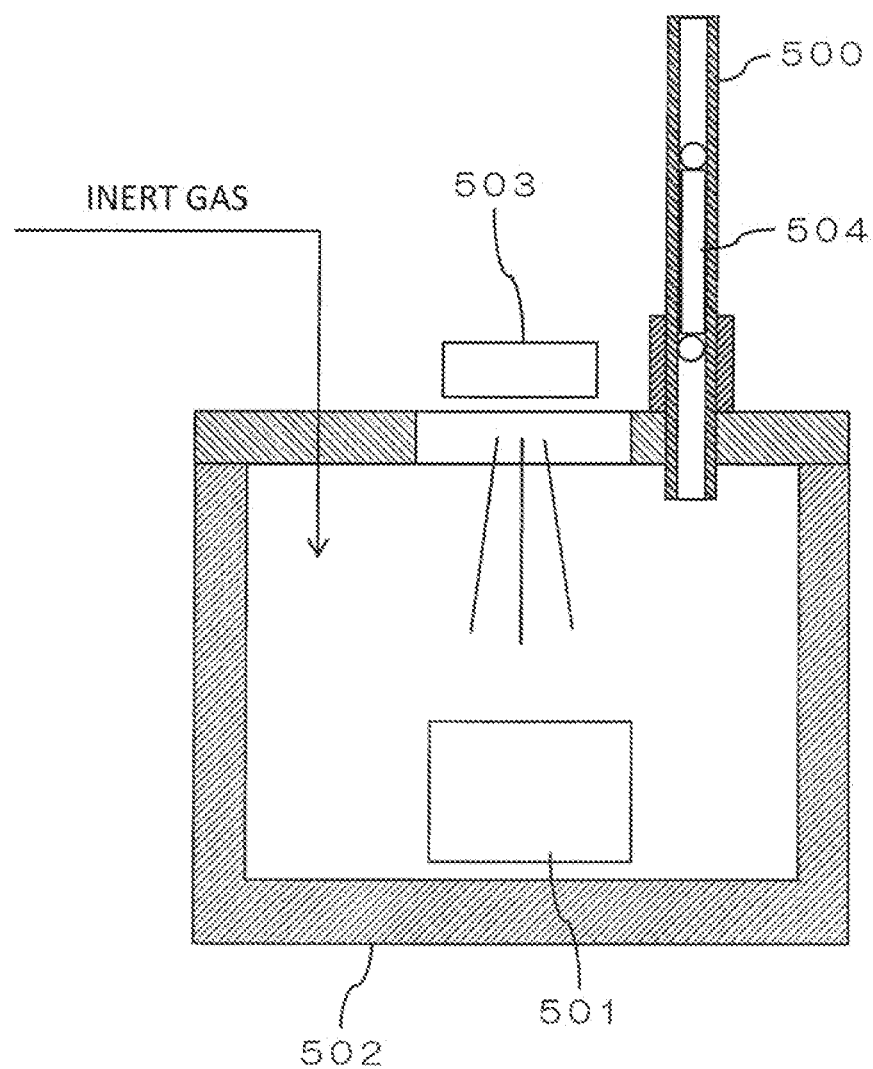
FIG. 10 is a schematic cross-sectional view for describing an aspect for trapping a sample in a sample tube.

FIG. 9 is a schematic cross-sectional view illustrating an example of the specific configuration in the heating unit 202. The ultraviolet irradiation unit 203 is attached to the heating unit 202. In the heating unit 202, a container holding part 4 for holding the container 3 is provided.

The container holding part 4 is made of, for example, a cylindrical member, and can hold the container 3 while housing the container 3 therein. A slit 41 is formed in the container holding part 4 so as to penetrate a wall surface of the container holding part 4. The slit 41 is formed in the container holding part 4 at a location facing the ultraviolet irradiation unit 203. As a result, ultraviolet rays emitted from the ultraviolet irradiation unit 203 pass through the slit 41 and are guided to the container 3.

According to such a configuration, the container 3 can be stably held by the container holding part 4, and the slit 41 formed in the container holding part 4 can limit the area through which ultraviolet rays pass in the container 3. Therefore, since the sample in the container 3 can be efficiently irradiated with ultraviolet rays, it is possible to perform an analysis more satisfactorily.

In addition, in this example, the container holding part 4 covers the periphery of the septum 32. That is, the wall surface of the container holding part 4 is positioned between the ultraviolet irradiation unit 203 and the septum 32. Part of the wall surface of the container holding part 4 located between the ultraviolet irradiation unit 203 and the septum 32 constitutes a mask part 42 for blocking ultraviolet rays from the ultraviolet irradiation unit 203 toward an end portion of the container 3. Therefore, since the end portion of the container 3 is not irradiated with ultraviolet rays, change in quality of the septum 32 provided at the end portion of the container 3 can be prevented.

However, the configuration of the container holding part 4 is not limited to the above-described configuration. For example, the above configuration in which the slit 41 and the mask part 42 are provided can also be applied to the first embodiment. In this case, since the mask part blocks ultraviolet rays from the ultraviolet irradiation unit 103 toward an end portion of the container 2, it is possible to prevent change in quality of the sealing member such as the O-ring provided in the container holding part 101.

5. Modification

In the above embodiments, the configurations in which samples vaporized in the containers 2, 3 are supplied to the gas chromatograph 1 side by using the trap parts 104, 205 and the sample loop 204 have been described. However, the present invention is not limited to such configurations, and any other configuration can be adopted for the sample supply part.

The number of each of the containers 2, 3 is not limited to one. A plurality of containers 2 or 3 may be provided. In addition, the configurations of the containers 2, 3 are not limited to the configurations as in the above embodiments. The container to which the present invention is applied may have any other shape or may be formed of any other material as long as a sample can be enclosed in the container, the sample in the container can be heated externally, and the sample inside the container can be irradiated with ultraviolet rays from outside.

In the embodiments described above, configurations have been described in which a sample is vaporized by heating the sample while irradiating the sample with ultraviolet rays. However, the present invention is not limited to the above configurations. For example, a configuration may be adopted in which after a sample is irradiated with ultraviolet rays, irradiation of the ultraviolet rays is stopped, and then the sample is heated to be vaporized.

DESCRIPTION OF REFERENCE SIGNS

1 gas chromatograph
2, 3 container
4 container holding part
11 sample introduction part
12 column
21 silica wool
22 sample
31 vial
32 septum
41 slit
42 mask part
100 sample introduction device
101 container holding part
102 heating unit
103 ultraviolet irradiation unit
104 trap part
105 flow channel switching part
106 sample supply part
200 sample introduction device
201 needle
202 heating unit
203 ultraviolet irradiation unit
204 sample loop
205 trap part
206 first flow channel switching part
207 second flow channel switching part
208 valve
209 flow channel switching part
210 sample supply part
211 sample supply part
300 sample introduction device

The invention claimed is:

1. A sample introduction device for a gas chromatograph comprising:
    a heating unit configured to vaporize a sample by externally heating a container in which the sample is enclosed;
    an ultraviolet irradiation unit configured to emit an ultraviolet ray that passes through a wall surface of the container from outside of the container and irradiates the sample with the ultraviolet ray;

a sample supply part configured to supply the sample vaporized in the container to a gas chromatograph side; and a container holder which holds the container;

wherein a slit is formed in the container holder, and the ultraviolet irradiation unit is configured to pass ultraviolet rays into the container through the slit.

2. The sample introduction device for a gas chromatograph according to claim 1, wherein the container is formed as a tubular member, and wherein the sample supply part is configured to supply a carrier gas from one-end side into the container, so that the sample supply part causes the sample vaporized in the container to flow out from another-end side of the container, and supplies the sample to the gas chromatograph side.

3. The sample introduction device for a gas chromatograph according to claim 2, wherein the sample supply part includes a trap that is configured to trap and concentrate the sample vaporized and flowing out from the another-end side of the container, and the sample supply part is configured to supply the sample concentrated in the trap part to the gas chromatograph side.

4. The sample introduction device for a gas chromatograph according to claim 1, wherein the container includes a vial in which the sample is enclosed and a septum which seals an end portion of the vial, and wherein the sample supply part includes a needle that is configured to penetrate the septum and be inserted into the vial, and the sample supply part is configured to cause the sample vaporized in the container to flow out from the needle and supplies to the gas chromatograph side.

5. The sample introduction device for a gas chromatograph according to claim 4, wherein the sample supply part includes a trap that is configured to trap and concentrate the sample vaporized and flowing out from the needle, and the sample supply part is configured to supply the sample concentrated in the trap part to the gas chromatograph side.

6. The sample introduction device for a gas chromatograph according to claim 1, wherein the container holder includes a mask configured to block an ultraviolet ray from the ultraviolet irradiation unit toward an end portion of the container.

7. The sample introduction device for a gas chromatograph according to claim 1, wherein the sample supply part comprises a flow channel switch and a trap, and wherein, when the flow channel switch is in a first state, the supply sample part provides a first fluid flow path extending from the container, through the trap, and out a discharge outlet.

8. The sample introduction device for a gas chromatograph according to claim 7, wherein, when the flow channel switch is in a second state, the sample supply part provides a second fluid flow path extending between the trap and a gas chromatograph outlet of the sample supply part.

9. The sample introduction device for a gas chromatograph according to claim 7, wherein, when the flow channel switch is in a second state, the first fluid flow path is closed.

* * * * *